(12) United States Patent
Haynes et al.

(10) Patent No.: US 7,874,210 B2
(45) Date of Patent: Jan. 25, 2011

(54) ULTRASONIC SENSOR ASSEMBLY AND METHOD

(75) Inventors: Kevin M. Haynes, Lombard, IL (US); Paul G. Janitch, Lisle, IL (US); James A. Bosserman, Aurora, IL (US)

(73) Assignee: Magnetrol International, Inc., Downers Grove, IL (US)

( * ) Notice: Subject to any disclaimer, the term of this patent is extended or adjusted under 35 U.S.C. 154(b) by 94 days.

(21) Appl. No.: 12/290,082

(22) Filed: Oct. 27, 2008

(65) Prior Publication Data

US 2009/0056451 A1 Mar. 5, 2009

Related U.S. Application Data

(62) Division of application No. 11/213,221, filed on Aug. 26, 2005, now abandoned.

(51) Int. Cl.
*G01N 24/00* (2006.01)
(52) U.S. Cl. .................. 73/570; 117/14; 117/201
(58) Field of Classification Search .......... 73/570, 73/584, 577, 627, 649, 662; 117/14, 201
See application file for complete search history.

(56) References Cited

U.S. PATENT DOCUMENTS

| | | | |
|---|---|---|---|
| 4,299,114 A * | 11/1981 | Silvermetz et al. | 73/1.83 |
| 4,764,166 A * | 8/1988 | Spani | 604/65 |
| 5,155,472 A * | 10/1992 | Dam | 340/621 |
| 5,207,101 A * | 5/1993 | Haynes | 73/597 |
| 5,269,188 A * | 12/1993 | Esin et al. | 73/610 |
| 5,406,200 A * | 4/1995 | Begin et al. | 324/207.12 |
| 5,428,984 A * | 7/1995 | Jones et al. | 73/1.73 |
| 5,434,555 A * | 7/1995 | Haynes | 340/515 |
| 5,452,611 A * | 9/1995 | Jones et al. | 73/290 V |
| 5,611,239 A * | 3/1997 | Klinshteyn | 73/290 V |
| 5,644,299 A * | 7/1997 | Cruickshank | 340/617 |
| 6,073,492 A * | 6/2000 | Rosselson et al. | 73/644 |
| 6,832,516 B1 * | 12/2004 | Dam et al. | 73/290 V |
| 2007/0074571 A1 * | 4/2007 | Haynes et al. | 73/584 |

* cited by examiner

*Primary Examiner*—Hezron Williams
*Assistant Examiner*—Samir M Shah
(74) *Attorney, Agent, or Firm*—Wood, Phillips, Katz, Clark & Mortimer

(57) ABSTRACT

An ultrasonic point level measurement instrument comprises a measurement circuit and a transducer. The transducer transmits and receives acoustic signals under control of the measurement circuit. An improvement in the transducer comprises a transducer housing including a pair of spaced apart legs to define a gap therebetween. Each leg includes an interior cavity. A pair of crystal assemblies each comprise a crystal mounted to a circuit board. The circuit board includes conduction paths for connection between the crystal and a terminal pad. Each crystal assembly is received in the interior cavity of one of the legs with the circuit board spacing the crystal from walls of the leg. A pair of cables are each connected between the measurement circuit and the terminal pad of one of the crystal assemblies so that the measurement circuit detects presence of a material in the gap.

12 Claims, 3 Drawing Sheets

ULTRASONIC SENSOR ASSEMBLY AND METHOD

CROSS REFERENCE TO RELATED APPLICATIONS

This application is a divisional of application Ser. No. 11/213,221 filed Aug. 26, 2005 now abandoned.

FIELD OF THE INVENTION

This invention relates to an ultrasonic point level measurement instrument and, more particularly, to an improved transducer and method of assembling a transducer.

BACKGROUND OF THE INVENTION

Knowledge of level in industrial process tanks or vessels has long been required for safe and cost-effective operation of plants. Many technologies exist for making level measurements. These include buoyancy, capacitance, ultrasonic and microwave radar, to name a few. Level measurement instruments may provide a continuous signal indicating level of the material in a tank or vessel, or may comprise point level measurement instruments that indicate the presence or absence of the material at a discrete level in the tank or vessel.

Ultrasonic level measurement instruments are designed for non-contact sensing or contact sensing. Contact liquid level sensing for point measurement is achieved by using continuous-wave or pulse-signal technology. Continuous-wave instruments have two piezoelectric crystals mounted opposite each other in a transducer body, separated by a gap. The transmit crystal produces an acoustical signal when subjected to an implied voltage from an amplifier circuit. The receive crystal converts the acoustical signal that it receives into an electrical signal, which becomes the input of the same amplifier circuit. When liquid is present in the transducer gap, the amplifier becomes an oscillator causing a relay circuit in the electronics to indicate a wet gap condition. When liquid vacates the gap, the amplifier returns to an idle state.

In pulse-signal units, a digital electronic amplifier produces a powerful pulse of ultrasonic energy more powerful than with most continuous-wave instruments. This allows measurement in conditions that include aeration, suspended solids, turbulence, and highly viscous liquids. Pulses of high-frequency ultrasonic energy milliseconds in duration are produced by the transmit crystal. In between each pulse, the receive crystal "listens" for the transmission. If liquid is present in the gap, the receive crystal detects the pulse and reports a wet gap condition to the electronics. When the gap is filled with air, the receive crystal cannot detect a pulse and reports a dry gap condition.

A transducer in one known form, sometimes referred to as tip-sensitive style, includes a housing with a pair of spaced apart legs to define a gap therebetween. Piezoelectric crystal assemblies that form the sensor drive and receive elements are hand assembled. They must have a plurality of spacers glued to one of the crystal surfaces to provide proper positioning. Wires must be attached to each side of the crystal for electrical connection. Electrical insulating spacers are placed inside the transducer housing. After the two crystal assemblies are placed in the sensor tip, the sensor assembly is potted. Thereafter, coaxial cables must be attached to the crystal wires, as by splicing. Thereafter, the electrical connections must be potted. This manual process can be time consuming. Also, there can be lack of uniformity in construction of the crystal assemblies and thus the sensor assembly.

The present invention is directed to improvements in ultrasonic sensor assembly.

SUMMARY OF THE INVENTION

In accordance with the invention, there is provided an improved ultrasonic sensor assembly and method.

There is disclosed in accordance with one aspect of the invention, an improvement in an ultrasonic point level measurement instrument comprising a measurement circuit and a transducer. The transducer transmits and receives acoustic signals under control of the measurement circuit. The improvement comprises a transducer housing including a pair of spaced apart legs to define a gap therebetween. Each leg includes an interior cavity. A pair of crystal assemblies each comprise a crystal mounted to a circuit board. The circuit board includes conduction paths for connection between the crystal and a terminal pad. Each crystal assembly is received in the interior cavity of one of the legs with the circuit board spacing the crystal from walls of the leg. A pair of cables are each connected between the measurement circuit and the terminal pad of one of the crystal assemblies so that the measurement circuit detects presence of a material in the gap.

It is a feature of the invention that each crystal is generally planar having opposite first and second conductive surfaces and the first conductive surface makes electrical contact with conductive pads on the circuit board. Each crystal assembly further comprises a connector electrically connecting the second conductive surface to conduction paths on the circuit board.

It is another feature of the invention that each circuit board insulates one side of the crystal from the walls of the leg and an insulating spacer insulates another side of the crystal from the walls of the leg. The insulating spacer biases the circuit board against one of the walls of the leg.

It is still another feature of the invention that the interior cavities are encapsulated with a compound, such as an epoxy.

There is disclosed in accordance with another aspect of the invention a transducer for an ultrasonic point level measurement instrument comprising a measurement circuit. The transducer transmits and receives acoustic signals under control of the measurement circuit. The transducer comprises a metal housing including a generally cylindrical body with a pair of spaced apart legs extending from the body. The legs are generally semi-cylindrical with facing planar walls to define a gap therebetween. Each leg includes an interior cavity opening into the body. A pair of crystal assemblies each comprise a crystal mounted to a circuit board. The circuit board includes conduction paths for connection between the crystal and a terminal pad. Each crystal assembly is received in the interior cavity of one of the legs with the circuit board against the planar wall and spacing the crystal from the planar wall. A pair of cables is each connected between the measurement circuit and the terminal pad of one of the crystal assemblies so that the measurement circuit detects presence of a material in the gap.

There is disclosed in accordance with a further aspect of the invention the method of assembling a transducer for an ultrasonic point level measurement instrument comprising a measurement circuit, the transducer for transmitting and receiving acoustic signals under control of the measurement circuit, comprising: providing a metal housing including a generally cylindrical body with a pair of spaced apart legs extending from the body, the legs being generally semi-cylindrical with facing planar walls to define a gap therebetween, each leg including an interior cavity opening into the body; assembling a plurality of crystal assemblies, for each comprising mounting a crystal to a circuit board, the circuit board including conduction paths for connection between the crystal and a terminal pad; inserting a crystal assembly in the interior cavity of each of the legs with the circuit board against the planar wall and spacing the crystal from the planar wall; and electrically connecting a cable between the measurement circuit and the terminal pad of each of the crystal assemblies so that the measurement circuit can detect presence of a material in the gap.

Further features and advantages of the invention will be readily apparent from the specification and from the drawings.

DETAILED DESCRIPTION OF THE INVENTION

Figure 1:
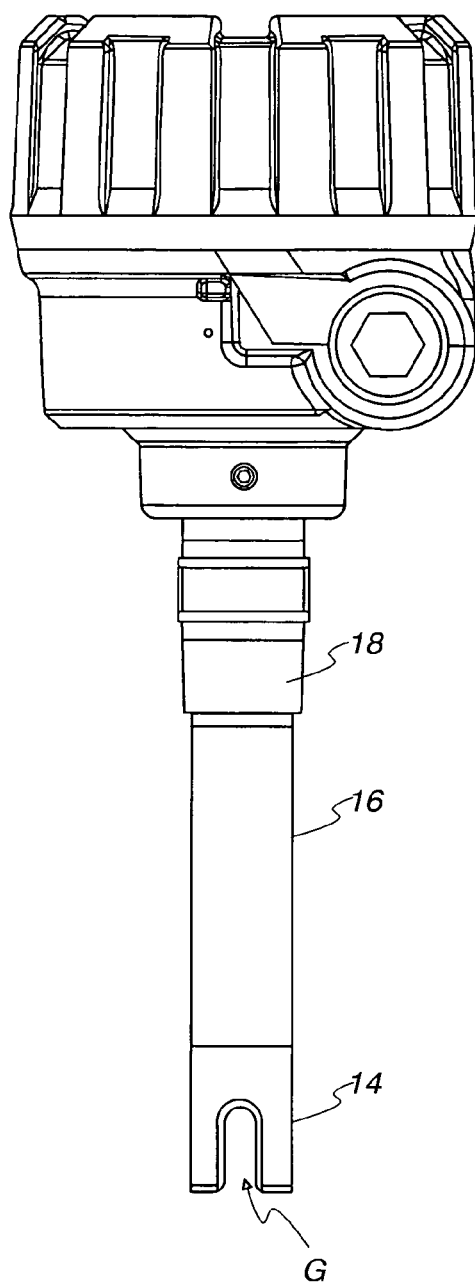
FIG. 1 is a side elevation view of an ultrasonic point level measurement instrument including an ultrasonic sensor assembly in accordance with the invention.

Referring to FIG. 1, a process instrument 10 according to the invention is illustrated. The process instrument 10 uses ultrasound technology for measuring point level. Particularly, an acoustic signal is transmitted between crystals to detect presence or absence of a material in a gap.

The process instrument 10 includes a control housing 12, a transducer 14 and an extension rod 16 connecting the transducer 14 to the control housing 12. The extension rod 16 may include a threaded fitting 18 for connection to a process vessel. Alternatively, a flange or other structure may be used.

Figure 6:
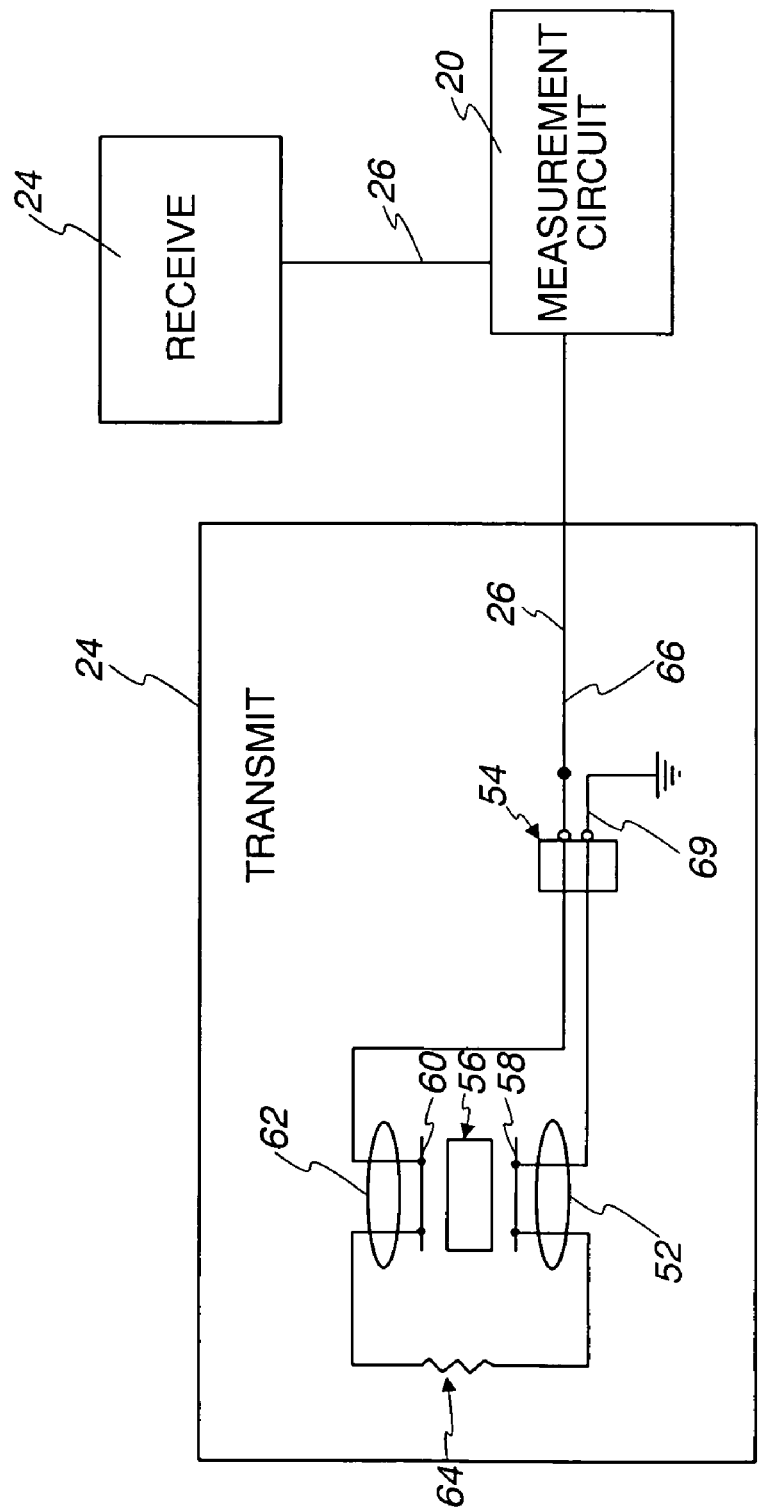
FIG. 6 is a schematic/block diagram of the point level measurement instrument of FIG. 1.

The control housing 12 houses a measurement circuit 20, see FIG. 6. The measurement circuit 20 is electrically connected, as described more particularly below, to a sensor assembly in the form of the transducer 14. In accordance with the invention, a less expensive and more consistent process is used for producing the transducer 14.

Figure 2:
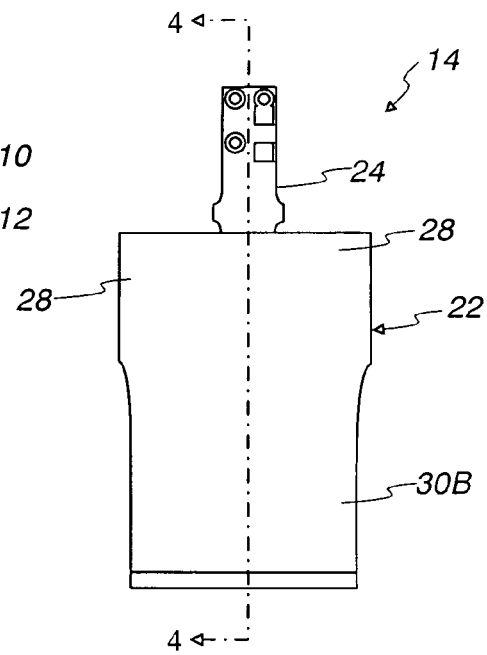
FIG. 2 is a side elevation view of the ultrasonic sensor assembly in accordance with the invention removed from the instrument of FIG. 1.
Figure 3:
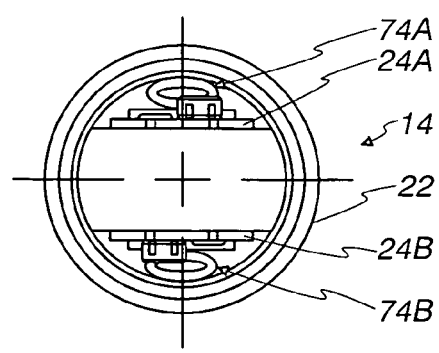
FIG. 3 is a top plan view of the ultrasonic sensor assembly of FIG. 2.
Figure 4:
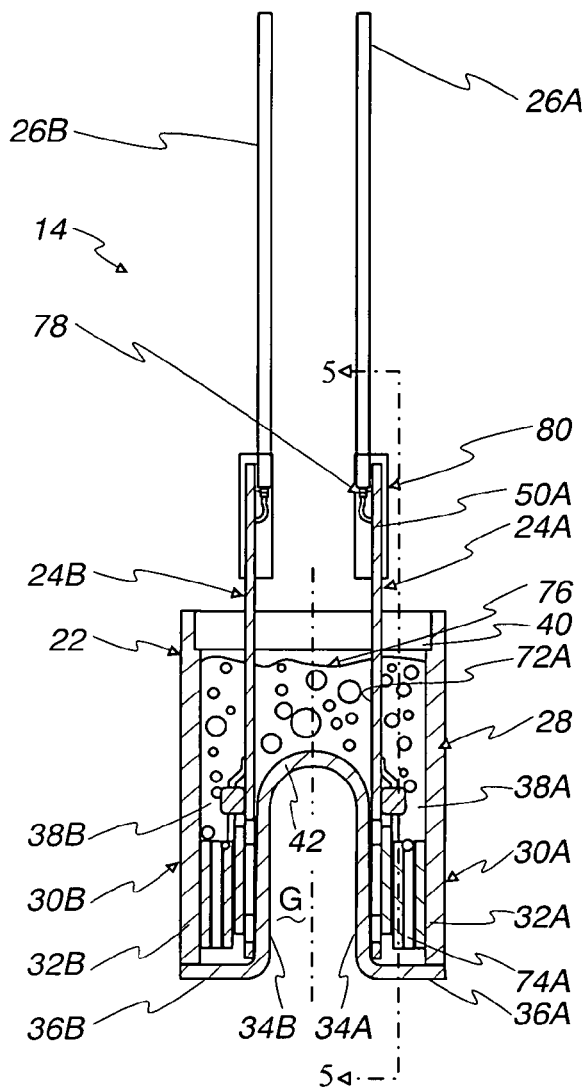
FIG. 4 is a sectional view taken along the line 4-4 of FIG. 2.

Referring particularly to FIGS. 2-4, the transducer, i.e., sensor assembly, 14 includes a metal housing 22, a pair of crystal assemblies 24A and 24B, and a pair of cables 26A and 26B electrically connecting the respective crystal assemblies 24A and 24B to the measurement circuit 20, see FIG. 6.

The housing 22 includes a generally cylindrical body 28 with a pair of spaced apart legs 30A and 30B extending from the body 28. The legs 30A and 30B are generally semi-cylindrical. Particularly, the first leg 30A comprises a semi-cylindrical wall 32A connected to a planar wall 34A. Similarly, the second leg 30B includes a semi-cylindrical wall 32B connected to a planar wall 34B. A distal end of each leg 30A and 30B is closed by a respective bottom wall 36A and 36B. Each leg includes an interior cavity 38A and 38B opening to an interior space 40 of the body 28. As is apparent, the radius of the semi-cylindrical walls 32A and 32B correspond to that of the body 28 to provide a continuous, seamless construction, as is particularly apparent in FIG. 4. Upper ends of the planar walls 34A and 34B are connected by a bridge wall 42. The planar walls 34A and 34B face one another to define a gap G therebetween.

The transducer housing 22 can be formed of various materials such as, for example, stainless steel. The particular material used for the housing 22 does not itself form part of the invention. Moreover, while the housing 22 is illustrated as being cylindrical with generally semi-cylindrical legs, other constructions can be used to form a gap.

Figure 5:
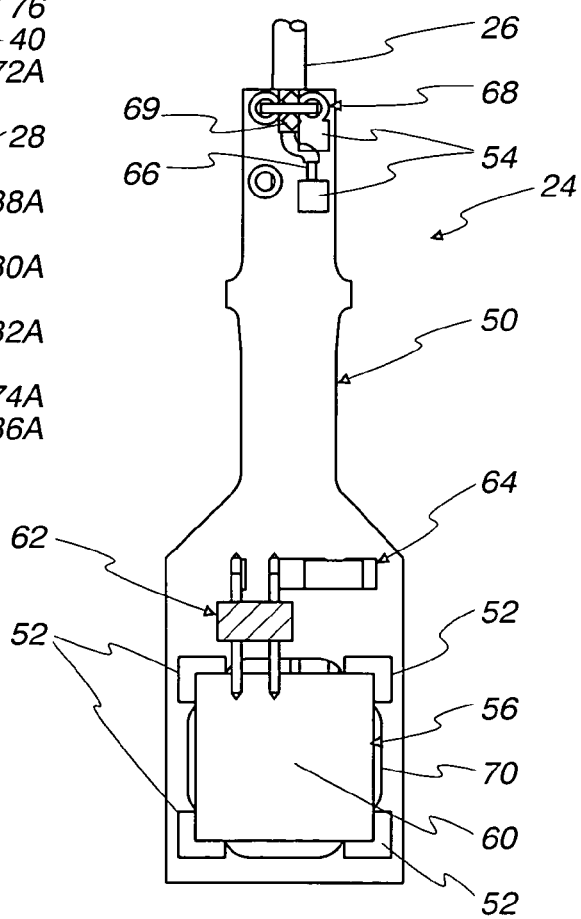
FIG. 5 is a sectional view taken along the line 5-5 of FIG. 4 specifically illustrating a crystal circuit assembly with other parts removed for clarity.

Referring to FIG. 5, a crystal assembly 24 is illustrated. In accordance with the invention, the crystal surface 24A and 24B, discussed above, are identical in construction. For simplicity, they are described generically relative to FIG. 5 and omitting the suffix A or B.

The crystal assembly 24 includes a printed circuit board 50. The printed circuit board includes conductive crystal pads 52 and terminal pads 54. As is conventional, the printed circuit board 50 is made of an insulating material. The circuit board 50 has various conduction traces or paths on either side and some covered by insulating layers and the like. FIG. 5 does not specifically illustrate the conductive paths. However, as will be apparent to one skilled in the art, the conductive paths connect the crystal pads 52 and the terminal pads 54 and other devices as illustrated schematically in FIG. 6, discussed below. Where the paths are located and how they are traced on the printed circuit board 50 is generally a matter of choice.

A crystal 56 is generally planar and include opposite first and second conductive surfaces 58 and 60, respectively, see also FIG. 6. The first conductive surface 58 contacts the crystal pads 52 so that the second conductive surface 60 faces away from the circuit board 50, as shown in FIG. 5. A two pin connector 62 is electrically connected between the second conductive surface 60 and the board 50. A resistor 64 is also mounted to the circuit board 50. Surface flow soldering is used to provide connections between the devices 56, 62 and 64 and the circuit board 50, with the connections from the connector 62 to the crystal second conductive surface 60 being made by soldering or the like.

Particularly, with reference also to FIG. 6, the electrical connections made by the various conduction paths are illustrated. The terminal pad 54 is electrically connected to the coaxial cable 26 by soldering a center conductor 66 to one of the terminal pads 54, and using a jumper 68 to connect a coaxial cable shield 69 to the other terminal pad 54. The shield 69 serves as a ground.

The center conductor 66 is electrically connected from the terminal pad 54 to one pin of the connector 62 to the crystal second conductive surface 60. The other pin of the connector 62 is connected to one side of the resistor 64. The resistor 64 may be, for example, a 10K resistor which can be used for testing or other purposes. The other side of the resistor 64 is electrically connected to the crystal pads 52 which are soldered to the crystal first conductive surface 58. The crystal pads 52 are also electrically connected to the cable shield 69.

In the illustrated embodiment of the invention, the crystal 56 is approximately ⅜" square and 0.060" thick. A conductive coating is placed on the opposite planar surfaces. The first conductive surface 58 makes contact with the terminal pads 52. The second conductive surface 60 makes contact with the connector 62. The circuit board 50 includes a generally square shaped opening 70 disposed between the four crystal pads 52 and thus beneath the crystal 56.

The process or method for assembling the transducer 22 is now described. To assemble the transducer 14, one housing 22 and two crystal assemblies 24A and 24B are used, along with two cables 26A and 26B. A contact cement or rubber cement is spread on the second conductive surface 60 of the crystal 56 to provide acoustic dampening. The circuit board 50A is then inserted into the first leg interior cavity 38A with the back side 72A up against the planar wall 34A. The width of the circuit board 50A is slightly less than the width of the interior cavity 38A so that it can be placed therein but it properly positions the crystal spaced from the planar wall 34A and semi-cylindrical wall 32A. A silicone insulating tube 74A is inserted in the cavity spaced between the semi-cylindrical wall 32A and the crystal second conductive surface 60 to bias the circuit board 50A against the planar wall 34A. A similar procedure is then used to install the second crystal assembly 24B in the second cavity 38B. Next, a two part epoxy 76 is used to pot the interior space 40 and interior cavities 38A and 38B. Thereafter, the cable 26A is soldered to the terminal pads 54A as at 78A and a shrink tube 80A placed over this connection to insulate the connection.

Referring to FIG. 6, the measurement circuit 20 is connected to two of the crystal assemblies 24. One crystal assembly is used for the transmit function, the other crystal assembly is used for the receive circuit. The particular function depends on electrical connections made to the measurement circuit 20, rather than position in the transducer housing 22. As is conventional, the transducer 14 transmits and receives acoustic signals under control of the measurement circuit 20 to detect presence or absence of a material in the gap cap G. The particular form of the acoustic signal and the control implemented by the measurement circuit 20 do not form part of the invention. Instead, the invention is directed to the transducer, or sensor assembly, construction and the method of making the same.

Thus, in accordance with the invention, the printed circuit board is used to provide numerous advantages over prior sensor assemblies. Particularly, the circuit board 50 provides electrical connection to the crystal 56. The thickness of the circuit board 50 acts as a spacer between the crystal 56 and the walls 34A or 34B. The circuit board 50 assures proper location of the crystal 56 so that other electrical insulating materials are not required. Also, the use of a printed circuit board enables use of automated assembly technology. The resultant crystal assembly 24 is more consistent and reliable. Also, the circuit board 50 is designed to mate directly to the coaxial cable 26. Finally, the printed circuit board 50 provides for additional functional test capability.

Thus, in accordance with the invention, there is disclosed an improved sensor assembly and method of manufacturing the sensor assembly.

We claim:

1. The method of assembling a transducer for an ultrasonic point level measurement instrument comprising a measurement circuit, the transducer for transmitting and receiving acoustic signals under control of the measurement circuit, comprising:

providing a housing including a body with a pair of spaced apart legs extending from the body, the legs including facing planar walls to define a gap therebetween, each leg including an interior cavity opening into the body;

assembling a plurality of crystal assemblies, each comprising a crystal mounted to a circuit board including a terminal pad;

inserting a crystal assembly in the interior cavity of each of the legs with the circuit board against the planar wall and spacing the crystal from the planar wall; and electrically connecting a cable between the measurement circuit and the terminal pad of each of the crystal assemblies so that the measurement circuit can detect presence of a material in the gap.

2. The method of claim 1 wherein each crystal is generally planar having opposite first and second conductive surfaces and the first conductive surface is soldered to conductive pads on the circuit board.

3. The method of claim 2 wherein assembling a plurality of crystal assemblies further comprises electrically connecting connectors between the second conductive surfaces and conduction paths on the circuit boards.

4. The method of claim 1 wherein each circuit board insulates one side of the crystal from the planar wall and further comprising inserting an insulating spacer between another side of the crystal and other walls of the leg.

5. The method of claim 4 wherein each insulating spacer biases the circuit board against the planar wall.

6. The method of claim 1 further comprising encapsulating the interior cavities with a potting compound.

7. The method of assembling a transducer for an ultrasonic point level measurement instrument comprising a measurement circuit, the transducer for transmitting and receiving acoustic signals under control of the measurement circuit, comprising:

providing a metal housing including a generally cylindrical body with a pair of spaced apart legs extending from the body, the legs being generally semi-cylindrical with facing planar walls to define a gap therebetween, each leg including an interior cavity opening into the body;

assembling a plurality of crystal assemblies, for each comprising mounting a crystal to a circuit board, the circuit board including conduction paths for connection between the crystal and a terminal pad;

inserting a crystal assembly in the interior cavity of each of the legs with the circuit board against the planar wall and spacing the crystal from the planar wall; and electrically connecting a cable between the measurement circuit and the terminal pad of each of the crystal assemblies so that the measurement circuit can detect presence of a material in the gap.

8. The method of claim 7 wherein each crystal is generally planar having opposite first and second conductive surfaces and the first conductive surface is soldered to conductive pads on the circuit board.

9. The method of claim 8 wherein assembling a plurality of crystal assemblies further comprises electrically connecting connectors between the second conductive surfaces and conduction paths on the circuit boards.

10. The method of claim 7 wherein each circuit board insulates one side of the crystal from the planar wall and further comprising inserting an insulating spacer between another side of the crystal and other walls of the leg.

11. The method of claim 10 wherein each insulating spacer biases the circuit board against the planar wall.

12. The method of claim 7 further comprising encapsulating the interior cavities with a potting compound.

* * * * *